March 17, 1953  A. M. WALLACE  2,631,361
METHOD OF MAKING WELDED TUBING FROM STRIP METAL STOCK
Filed May 8, 1950  3 Sheets-Sheet 1
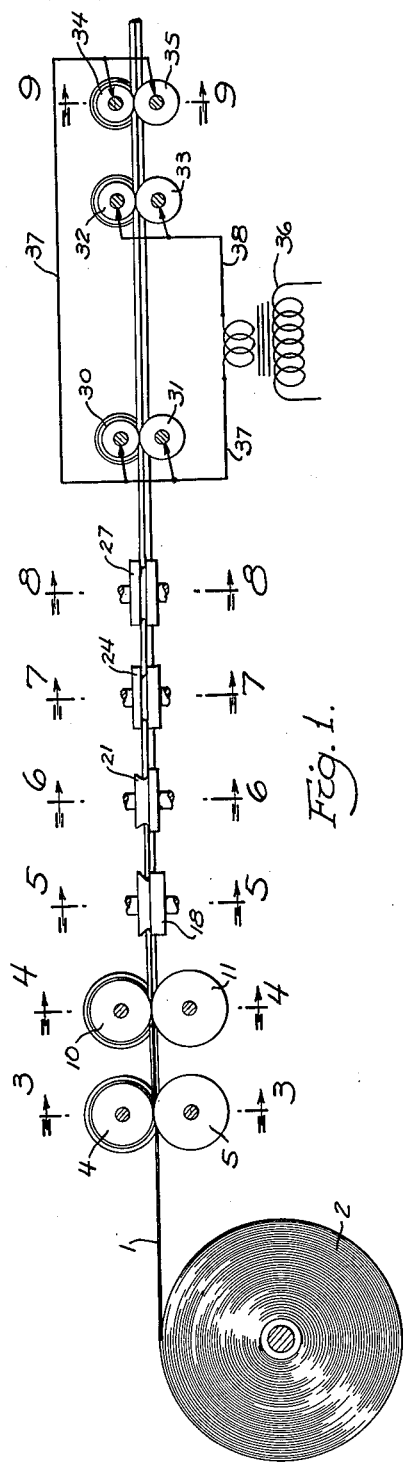
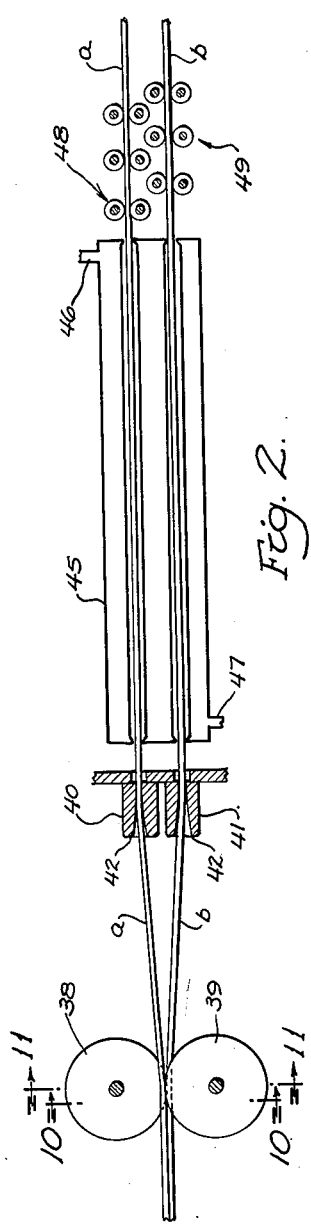
INVENTOR.
Arthur M. Wallace
BY
Barnes, Kisselle, Laughlin & Raisch
Attorneys.

March 17, 1953　　　A. M. WALLACE　　　2,631,361

METHOD OF MAKING WELDED TUBING FROM STRIP METAL STOCK

Filed May 8, 1950　　　3 Sheets-Sheet 2

INVENTOR.
Arthur M. Wallace
BY Barnes, Kisselle, Laughlin & Raisch
Attorneys.

March 17, 1953 A. M. WALLACE 2,631,361
METHOD OF MAKING WELDED TUBING FROM STRIP METAL STOCK
Filed May 8, 1950 3 Sheets-Sheet 3

INVENTOR.
Arthur M. Wallace
BY Barnes, Kisselle Laughlin & Raisch
Attorneys.

Patented Mar. 17, 1953

2,631,361

UNITED STATES PATENT OFFICE 2,631,361

METHOD OF MAKING WELDED TUBING FROM STRIP METAL STOCK

Arthur M. Wallace, Detroit, Mich., assignor to Bundy Tubing Company, Detroit, Mich., a corporation of Michigan Application May 8, 1950, Serial No. 160,746

5 Claims. (Cl. 29—156)

1

This invention relates to a method of manufacturing tubing from strip metal stock and it has to do particularly with a method of making welded tubing.

The objects of the invention include the provision of a method by which tubing can be made with facility and with lower manufacturing costs and at the same time providing an improved tubing with a welded seam which has a minimum of burr effect at the weld. To these ends two tubes, initially integrally joined, are formed from a single strip of stock with one pass of the stock through a tube forming apparatus and with one welding operation. The strip is so formed that the portions which have the interfaces to be weld united are brought together in a substantially perpendicular manner relative to each other and thus can be effectively held together without distortion, and a weld effected throughout the full area of the interfaces with a minimum of burr or projecting fin effect.

In accordance with the method, the strip is so fashioned that the tubes can be formed by external forces only and held in position for welding by external forces. By using a single strip, the cost of the strip stock is reduced and the tolerances thereof need not be held so close. Moreover, there is no waste of material. After the two tubes are thus formed and the interfaces weld united, the combined tubing structure is severed thus providing two tubes, and then the two tubes may each be subjected to a rounding operation or sizing operation to fashion the tubes into substantially circular form in cross section.

The invention is disclosed in the accompanying drawings wherein:

Fig. 1 is a general view illustrating a tube forming mill and a welding means.

Fig. 2 is a view illustrating slitting rolls, sizing dies, and cooler which is normally positioned in alignment with the tube mill and welder shown in Fig. 1.

2

Figure 7:
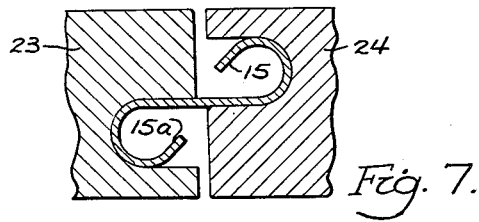

Fig. 7 is a sectional view taken on line 7—7 of Fig. 1 showing the work performed on the strip by the fifth set of forming rolls.

Figure 8:
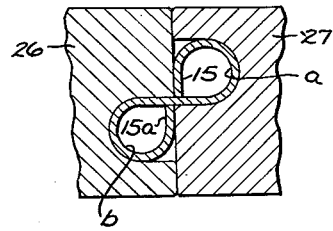

Fig. 8 is a sectional view taken on line 8—8 of Fig. 1 showing the strip stock as acted upon by the final set of forming rolls.

Figure 9:
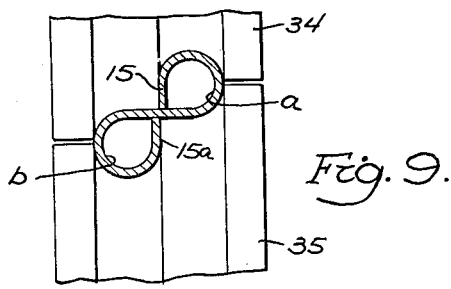

Fig. 9 is a sectional view taken on line 9—9 of Fig. 1 showing the final electrodes.

Figure 10:
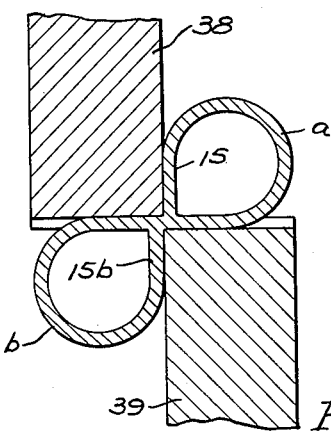

Fig. 10 is a sectional view taken on line 10—10 of Fig. 2 showing the formed double tube between the slitting rolls.

Figure 11:
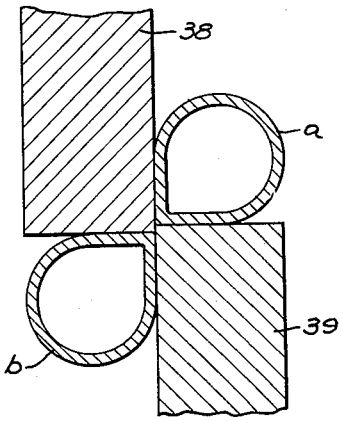

Fig. 11 is a sectional view taken on line 11—11 of Fig. 2 showing the slitting operation completed.

Figure 12:
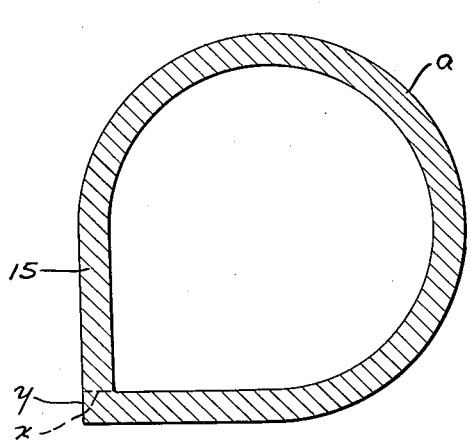

Fig. 12 is a cross sectional view of enlarged nature illustrating a completed tubing prior to the rounding operation.

Figure 13:
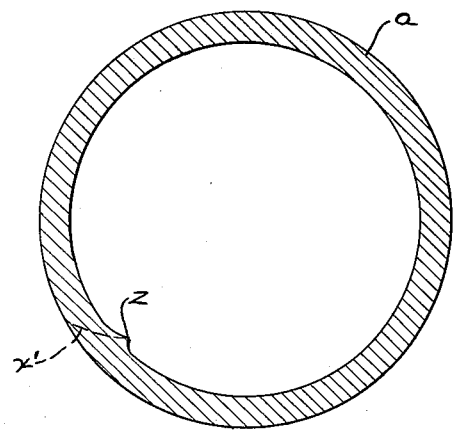

Fig. 13 is a sectional view taken through a finished tube and illustrating, by a broken line, the approximate location of the weld.

Figure 3:
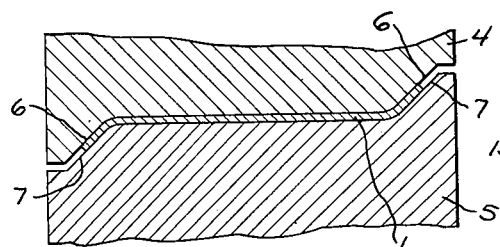
Fig. 3 is a sectional view taken on line 3—3 of Fig. 1 showing the first pair of forming rolls and indicating the work they do on the strip stock.

The strip stock is indicated at 1 and it may be drawn from a coil 2 and moved through the tube forming mill. Ordinarily, the strip stock is of steel but, of course, the invention is applicable to other metals. The tube mill has a plurality of pairs of forming rolls which act upon the strip to fashion the same. The drawing illustrates six different pairs of forming rolls but, of course, this is subject to variation depending upon how many pairs of rolls are needed to properly work a given strip of metal. The first pair of forming rolls are indicated at 4 and 5 and these are preferably disposed on horizontal axes. These rolls are formed with inclined surfaces 6 and 7 for bending the stock near its edges, as shown in Fig. 3. One edge of the strip is bent in one direction and the other edge is bent in the opposite direction relative to the central body portion of the strip which remains substantially flat.

Figure 4:
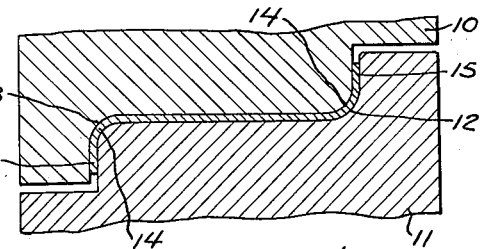
Fig. 4 is a view similar to Fig. 3, taken on line 4—4 of Fig. 1 showing the second set of forming rolls and indicating the work performed on the strip.

The second set of rolls 10 and 11 are formed with cooperating peripheral shapes, as shown in Fig. 4. These rolls are formed with curved surfaces 12 and 13 to fashion portions of the strip into curves 14 substantially on the radius of the tube to be formed, while placing the edge portions of the strip, as shown at 15 and 15a, in a position substantially perpendicular to the central body portion of the strip so that the edge portions are straight and meet the curves 14 substantially tangentially. The radius or curved portions 14 are substantially through 90°.

Figure 5:
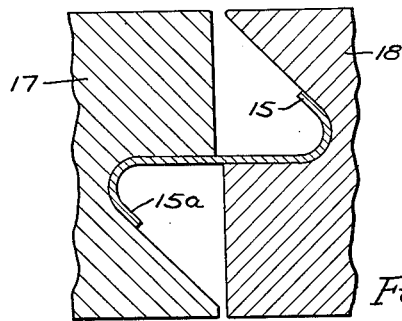
Fig. 5 is a sectional view taken on line 5—5 of Fig. 1 showing the work acted upon by the third set of forming rolls.

The remaining sets of forming rolls are conveniently placed on vertical axes and the next set of rolls are indicated at 17 and 18. These rolls are shaped to continue the bending of the edge portions of the strip, as indicated in Fig. 5.

Figure 6:
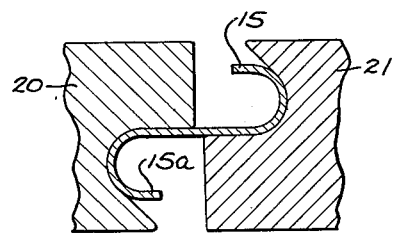
Fig. 6 is a sectional view taken on line 6—6 of Fig. 1 showing the strip as acted upon by the fourth set of forming rolls.

The next pair of bending rolls 20 and 21 further bend the strip so that, as shown in Fig. 6, each bend has progressed through about 180°. The next pair of bending rolls, as shown in Fig. 7, are indicated at 23 and 24 continue the bending action as indicated in Fig. 7. The final pair of bending rolls as indicated at 26 and 27 in Fig. 8 complete the fashioning of the strip and the edge portions 15 and 15a are now positioned with their edge faces in interfacial relationship with the central portion of the strip. The portions 15 and 15a are substantially perpendicular to the intermediate portion of the strip and are displaced from each other an extent substantially equal to the thickness of the strip, so that the outer surface of the portion 15 and the outer surface of the portion 15a are in substantial alignment with each other.

This completes the forming operation and the strip is substantially in its final geometric shape. It will be noted that the edge portions 15 and 15a remain straight, i. e., these portions have not been bent from the original flat condition of the strip it will also be noted that the central or intermediate section of the strip remain straight while the portions of the strip which lie on either side of the intermediate section and between the intermediate section and the end portions are fashioned through substantially 270°.

With the strip thus formed into two tubes or tubing sections, the term "tube" and term "tubing" being used synonymously, illustrated at $a$ and $b$, it is subjected to a welding operation and the welding means may be positioned downstream from the tube mill as shown in Fig. 1, so that the formed strip moves directly into the welding means. This welding means, as shown in Fig. 1 is of the type which heats the strip by electrical resistance, the electrical current passing lengthwise therethrough. The welding means embodies a pair of electrode rollers 30 and 31, a second pair of electrode rollers 32 and 33 and a final pair of electrode rollers 34 and 35. A suitable transformer is indicated at 36 and the secondary thereof is connected on one side by a conductor 37 to the electrodes 30—31 and 34—35. The other side of the secondary is connected by a conductor 38 to the immediate electrodes 32—33. Electrical current flows from the electrodes 30—31 through the formed strip to electrodes 32—33 and from electrodes 34—35 through the formed strip to the electrodes 32—33 and alternate impulses of alternating current flows reversely. The electrical input is such as to bring the metal to welding temperature.

The final electrodes 34—35, as shown in Fig. 9, apply suitable pressure to force the edge faces of the straight portions 15 and 15a against opposite faces of the intermediate portion of the strip to thereby weld the inter-faces together. Adequate pressure may be applied without internal support for the two tubes because the portions 15 and 15a are straight and perpendicular or substantially perpendicular to the intermediate portion.

The welded form next moves through slitting means as shown in Fig. 2, which may comprise slitting rollers 38 and 39. These rollers slightly overlap each other and shear the strip, as shown in Fig. 11, in the plane of the outside surfaces of the two portions 15 and 15b. Thus, two tubes are formed each having a shape as indicated by the enlarged view (Fig. 12). In this view, the weld line is indicated at $x$ and the location of the shear is indicated at $y$. Accordingly, there is no wasted material or scrap and each tube has straight portions meeting each other at about 90°.

Downstream from the slitting rolls the two tubes $a$ and $b$ may be separated from each other somewhat and each passed through a sizing die 40 and 41. Each sizing die has a tapered entrance opening 42 which gradually reduces in size and which, at its outlet end, is of circular form where a round or circular tube is desired. The tubes are forcibly pulled through these dies and the shape of the tubes, as shown in Fig. 12, is corrected and made circular in form as indicated in Fig. 13. In this action, the location of the weld $x$ is shifted to a position somewhat as indicated by the dotted line $x'$ in Fig. 13. Also, because there is no internal support for the tubing, and because there is a slight excess of metal at the point or apex of the angle shown in Fig. 12, there may be a slight protrusion of metal as indicated at $z$ on the interior of the tube (Fig. 13).

The shearing operation and the sizing operation preferably takes place immediately after the tubing emerges from the welding device and while the tubes are still hot. Accordingly, immediately downstream from the sizing dies the tubes may be moved through a cooler 45, shown in Fig. 2, as being of the jacketed type with a cooling fluid such as water entering the jacket through inlet pipe 46 and discharging through outlet pipe 47. Near the outlet end of the cooler is a final set of pulling rolls which pull the strip and tubes through the slitting rolls and through the sizing dies. These are shown as a set of pulling rolls 48 applied to the tube $a$ and a set of pulling rolls 49 applied to the tube $b$. Of course, various ones of the forming rolls in the tube mill are driven so that the final pulling rolls do not necessarily pull the strip through the tube mills. While it is usually the desire to make tubes of circular form in cross section, the tubing of this invention is structurally completed before the same is rounded into circular form and can be used in the form shown in Fig. 12. Such a tube may be desired in heat exchange apparatus, as, for example, in the refrigeration industry, where a flat face of the tube may be seated upon and secured to the surface of a heat dissipating sheet of material.

Inasmuch as two tubes are made from a single strip, the stock is obtainable at a cost lower than the cost of obtaining two strips because the operations of providing the stock are reduced. Then, too, the tolerances of the strip do not have to be maintained as close as heretofore. Moreover, the method may be carried out at a relatively high rate of speed so that not only are two tubes provided with a single pass of a single strip through the apparatus, but the two tubes can be made at a high rate of speed.

It is thought that the present invention is particularly applicable to small size tubing such, for example, as tubing having outside diameters in the nature of $\frac{3}{16}"$, $\frac{1}{4}"$ and $\frac{5}{16}"$. While the advantages of the invention may be particularly applicable to small size tubing the invention is not limited to small size tubing.

I claim:

1. The method of making tube from strip metal stock which comprises, fashioning portions of the strip which lie between a longitudinal intermediate section thereof and opposite edge portions thereof, into curvilinear form and in opposite directions relative to the intermediate section, while leaving the intermediate section and the opposite edge portions substantially straight, bringing the opposite edge portions into positions substantially perpendicular to the intermediate section and on opposite sides thereof and offset relative to each other so that the intermediate section may be cut between the outside surfaces of said edge portions, with the edge faces of said edge portions in interfacial relationship with faces of the intermediate section, weld uniting the interfaces, cutting the intermediate section at the location between the outside surfaces of said edge portions to provide two separate tubes each of which has an angular formation in its wall, and then rounding the tubes into substantially circular form in cross section.

2. The method of making tube from strip metal stock which comprises, fashioning portions of the strip which lie between a longitudinal intermediate section thereof and opposite edge portions thereof, oppositely into curvilinear form, while leaving the intermediate section and the opposite edge portions substantially straight, bringing the opposite edge portions into positions substantially perpendicular to the intermediate section and on opposite sides thereof and offset relative to each other so that the intermediate section may be cut between the outside surfaces of said edge portions and with the edge faces of said edge portions in interfacial relationship with faces of the intermediate section, weld uniting the interfaces, and then cutting the intermediate sections at the location between the outside surfaces of said edge portions to provide two separate tubes.

3. The method of making tube from strip metal stock which comprises, fashioning portions of the strip which lie on opposite sides of a longitudinal intermediate section thereof oppositely into curvilinear form, while leaving the intermediate section substantially straight, bringing the opposite edge portions into positions on opposite sides of the intermediate section, and disaligned relative to each other substantially to the extent that the outer surfaces of the two edge portions are in approximate alignment and with the edge faces of said edge portions in interfacial relationship with faces of the intermediate section, uniting the interfaces, cutting the intermediate section at a location between said edge portions to provide two separate tubes, and then rounding the tubes into substantial circular form in cross section.

4. The method of making tube from flat strip metal stock which comprises, fashioning portions of the strip which lie between a longitudinal intermediate section thereof and opposite edge portions thereof oppositely into curvilinear form through substantially 270°, while leaving the intermediate section and the opposite edge portions substantially straight so that the edge portions are each positioned substantially perpendicular to and on opposite sides of the intermediate section, placing the edge faces of the edge portions in interfacial relationship with opposite sides of the intermediate section and offset from each other so that the intermediate section may be cut between the outside surfaces of said edge portions, weld uniting the interfaces, cutting the intermediate section at the location between said edge portions to provide two separate tubes each of which has an angular formation of substantially 90° in its wall, and then rounding the tubes into substantially circular form in cross section.

5. The method of making tube from flat strip metal stock which comprises, fashioning portions of the strip which lie between a longitudinal intermediate section thereof and opposite edge portions thereof into curvilinear form through substantially 270°, while leaving the intermediate section and the opposite edge portions substantially straight so that the edge portions are each positioned substantially perpendicular to the intermediate section, and on opposite sides thereof, and disaligned from each other substantially to the extent of the thickness of the stock, and with the edge faces thereof in interfacial relationship with faces of the intermediate section, weld uniting the interfaces, cutting the intermediate section at a location in substantial alignment with the outside faces of said edge portions to provide two separate tubes each of which has an angular formation of substantially 90° in its wall, and then rounding the tubes into substantially circular form in cross section.

ARTHUR M. WALLACE.

REFERENCES CITED

The following references are of record in the file of this patent:

UNITED STATES PATENTS

| Number | Name | Date |
| --- | --- | --- |
| 29,276 | Holmes | July 24, 1860 |
| 159,007 | Wilmot | Jan. 19, 1875 |
| 450,839 | Walcott | Apr. 21, 1891 |
| 1,979,963 | Decker | Nov. 6, 1934 |
| 2,014,982 | Quarnstrom | Sept. 17, 1935 |
| 2,401,542 | Booth | June 4, 1946 |